(12) United States Patent
Boulemnakher et al.

(10) Patent No.: US 12,472,136 B2
(45) Date of Patent: Nov. 18, 2025

(54) COMPOSITION COMPRISING AT LEAST ONE ALKYL (POLY)GLYCOSIDE, AT LEAST ONE FATTY ALCOHOL, AT LEAST ONE FATTY ACID, AND AT LEAST ONE ALKALINE AGENT

(71) Applicant: L'Oreal, Paris (FR)

(72) Inventors: Sarah Boulemnakher, Saint Ouen (FR); Marie Giafferi, Saint Ouen (FR)

(73) Assignee: L'Oreal, Paris (FR)

( * ) Notice: Subject to any disclaimer, the term of this patent is extended or adjusted under 35 U.S.C. 154(b) by 40 days.

(21) Appl. No.: 18/573,928

(22) PCT Filed: Jun. 29, 2022

(86) PCT No.: PCT/EP2022/067996
§ 371 (c)(1),
(2) Date: Dec. 22, 2023

(87) PCT Pub. No.: WO2023/275204
PCT Pub. Date: Jan. 5, 2023

(65) Prior Publication Data
US 2024/0285498 A1  Aug. 29, 2024

(30) Foreign Application Priority Data
Jun. 30, 2021  (FR) ...................................... 2107109

(51) Int. Cl.
*A61Q 5/10* (2006.01)
*A61K 8/60* (2006.01)
*A61Q 5/08* (2006.01)

(52) U.S. Cl.
CPC ............... *A61K 8/604* (2013.01); *A61Q 5/08* (2013.01); *A61Q 5/10* (2013.01); *A61K 2800/4322* (2013.01); *A61K 2800/884* (2013.01)

(58) Field of Classification Search
CPC ............ A61K 8/604; A61K 2800/4322; A61K 2800/884; A61K 2800/88; A61K 8/342; A61K 8/361; A61Q 5/08; A61Q 5/10

USPC ............................................................. 8/405
See application file for complete search history.

(56) References Cited

U.S. PATENT DOCUMENTS

| 2004/0064903 | A1* | 4/2004 | Massoni | A61K 8/41 8/405 |
| 2015/0082554 | A1* | 3/2015 | Allard | A61K 8/604 8/408 |
| 2016/0151266 | A1* | 6/2016 | Neuba | A61Q 5/10 206/568 |
| 2017/0340536 | A1* | 11/2017 | Nicou | A61K 8/86 |

FOREIGN PATENT DOCUMENTS

| EP | 3 028 690 | 6/2016 |
| FR | 2 988 595 | 10/2013 |
| WO | 2014/175676 | 10/2014 |

OTHER PUBLICATIONS

International Search Report and Written Opinion for International Application No. PCT/EP2022/067996, mailed Oct. 13, 2022, 14 pages.
Mintel, Hydra-No Frizz Combing Treatment, (2017), XP055906131, 3 pages.

* cited by examiner

*Primary Examiner* — Eisa B Elhilo
(74) *Attorney, Agent, or Firm* — Christensen O'Connor Johnson Kindness PLLC

(57) ABSTRACT

The present invention relates to a composition for treating keratin fibres, notably human keratin fibres such as the hair, comprising at least one (C14-C30)alkyl (poly)glycoside, at least one fatty alcohol, at least one fatty acid, at least one alkaline agent and optionally at least one dye chosen from oxidation dyes, direct dyes and mixtures thereof. The present invention also relates to a process for dyeing and/or lightening keratin fibres, such as the hair, wherein the composition as described previously is applied to said fibres. The present invention also relates to the use of the composition according to the invention for dyeing and/or lightening, preferably dyeing, keratin fibres such as the hair.

21 Claims, No Drawings

COMPOSITION COMPRISING AT LEAST ONE ALKYL (POLY)GLYCOSIDE, AT LEAST ONE FATTY ALCOHOL, AT LEAST ONE FATTY ACID, AND AT LEAST ONE ALKALINE AGENT

CROSS-REFERENCE TO RELATED APPLICATIONS

This application is a U.S. National Stage Application of PCT/EP2022/067996, filed Jun. 29, 2022, which claims the benefit of FR2107109, filed Jun. 30, 2021, the disclosures of which are incorporated herein in their entirety.

The present invention relates to a composition for treating keratin fibres, notably human keratin fibres such as the hair, comprising at least one (C14-C30)alkyl (poly)glycoside, at least one fatty alcohol, at least one fatty acid, at least one alkaline agent and optionally at least one dye chosen from oxidation dyes, direct dyes and mixtures thereof.

The present invention also relates to a process for dyeing and/or lightening keratin fibres, such as the hair, wherein the composition as described previously is applied to said fibres.

In particular, the present invention also relates to a process for dyeing keratin fibres such as the hair, wherein the composition as described previously, and comprising at least one dye chosen from oxidation dyes, direct dyes and mixtures thereof, is applied to said fibres.

The present invention also relates to the use of the composition according to the invention for dyeing and/or lightening, preferably dyeing, keratin fibres such as the hair.

In the processes for dyeing keratin fibres, it is known practice to dye keratin fibres via various techniques using direct dyes for non-permanent dyeing, or oxidation dye precursors for permanent dyeing.

Non-permanent dyeing or direct dyeing consists in dyeing keratin fibres with dye compositions containing direct dyes. These dyes are coloured and colouring molecules that have affinity for keratin fibres. They are applied to the keratin fibres for a time necessary to obtain the desired colouring, and are then rinsed out.

Some of these dyes may be used under lightening conditions, which enables the production of colourings that are visible on dark hair.

It is also known practice to dye keratin fibres permanently via oxidation dyeing. This dyeing technique consists in applying to the keratin fibres a composition containing dye precursors such as oxidation bases and couplers. Under the action of an oxidizing agent, these precursors form one or more coloured substances in the hair.

Existing dyeing and/or lightening processes generally use cosmetic compositions comprising a certain number of ingredients, for which the regulatory conditions are increasingly strict. It is thus necessary to develop compositions comprising alternative ingredients.

Consumers are notably in search of dyeing and/or lightening products that are more environmentally friendly, notably based on ingredients of natural origin, and which have good working qualities, are easy to use and give good dyeing and/or lightening properties.

Furthermore, the "natural" dyeing compositions currently available on the market do not make it possible to obtain colourings that are sufficiently persistent in the face of external agents such as light, perspiration, washing, or else rubbing.

The performance of the colourings obtained with such compositions is also lower compared to the performance obtained with conventional dye compositions, notably in terms of colour uptake, power and chromaticity.

Thus, there is a real need for a composition for dyeing and/or lightening keratin fibres, in particular human keratin fibres such as the hair, which is more environmentally friendly and which does not have the abovementioned drawbacks, i.e. which is capable of resulting in a good performance, notably in terms of colour uptake, power and chromaticity when it comprises one or more dyes and/or good lightening performance, while at the same time having low selectivity and good persistence and which is capable of giving good dyeing performance, or good lightening performance, even after a period of storage, while at the same time having good working qualities.

A subject of the present invention is thus a cosmetic composition comprising:
one or more (C14-C30)alkyl (poly)glycosides,
from 8% to 35% by weight of one or more fatty alcohols, relative to the total weight of the composition,
one or more fatty acids,
one or more alkaline agents,
optionally one or more dyes chosen from oxidation dyes, direct dyes and mixtures thereof.

The composition according to the invention makes it possible to achieve the above objectives, notably in terms of colour uptake, dyeing power, chromaticity, selectivity and, persistence of the dyeing, in particular to shampoo washes when it comprises one or more dyes, and/or good performance in terms of lightening, and also good working qualities.

The composition according to the invention also makes it possible to result in a good cosmetic quality, notably in terms of sheen, in a more natural feel, and in a good level of comfort and while preserving the integrity of the fibre.

Furthermore, the composition according to the invention shows good stability. The composition may notably comprise dyes and/or other compounds in the form of salts.

The composition according to the invention furthermore has a smaller change in its appearance, notably less browning, during the use thereof.

Moreover, the composition according to the invention has good working qualities, notably a creamy texture allowing quick and easy mixing with an oxidizing composition, where appropriate, and easy and uniform spreading over the entire head of hair. The composition according to the invention has good stability over time, notably little or no change in its viscosity during storage.

The present invention also relates to a process for dyeing and/or lightening keratin fibres, in particular human keratin fibres such as the hair, wherein, applied to said fibres, is a composition comprising:
one or more (C14-C30)alkyl (poly)glycosides,
from 8% to 35% by weight of one or more fatty alcohols relative to the total weight of the composition,
one or more fatty acids,
one or more alkaline agents,
optionally one or more dyes chosen from oxidation dyes, direct dyes, and mixtures thereof.

In particular, the present invention relates to a process for dyeing keratin fibres, in particular human keratin fibres such as the hair, wherein, applied to said fibres, is a composition comprising:
one or more (C14-C30)alkyl (poly)glycosides,
from 8% to 35% by weight of one or more fatty alcohols relative to the total weight of the composition,
one or more fatty acids,
one or more alkaline agents, one or more dyes chosen from oxidation dyes, direct dyes and mixtures thereof.

The present invention also relates to the use of the composition according to the invention for dyeing and/or lightening, preferably dyeing, keratin fibres, in particular human keratin fibres such as the hair.

Other subjects, features, aspects and advantages of the invention will become even more clearly apparent on reading the description and the example which follows.

In the text hereinbelow, unless otherwise indicated, the limits of a range of values are included in that range, notably in the expressions "between" and "ranging from . . . to . . . ".

Moreover, the expression "at least one" used in the present description is equivalent to the expression "one or more".

(C14-C30)Alkyl (Poly)Glycosides

The composition according to the invention comprises one or more (C14-C30)alkyl (poly)glycosides.

The term "alkyl (poly)glycoside" denotes an alkyl polyglycoside or an alkyl monoglycoside, also referred to in the present patent application as an alkyl glycoside, which may be alkoxylated with one or more alkylene oxide groups, preferentially $C_2$-$C_4$ alkylene oxide groups.

The (C14-C30)alkyl (poly)glycoside(s) used, alone or as mixtures, in accordance with the present invention may be represented by formula (X) below:

$$R_1O\text{---}(R_2O)_t(G)_v \qquad (X)$$

in which formula (X):
- $R_1$ represents a linear or branched, saturated or unsaturated alkyl group including from 14 to 30 carbon atoms, or an alkylphenyl group in which the linear or branched alkyl group includes from 14 to 30 carbon atoms,
- $R_2$ represents an alkylene group including from 2 to 4 carbon atoms,
- G represents a saccharide unit including 5 or 6 carbon atoms,
- t denotes a value ranging from 0 to 10 and preferably 0 to 4, and
- v denotes a value ranging from 1 to 15.

Preferably, the alkyl (poly)glycoside(s) correspond to formula (X) in which:
- $R_1$ denotes a linear or branched, saturated or unsaturated alkyl group including from 14 to 22 carbon atoms, preferably 14 to 20 carbon atoms, better still 16 to 18 carbon atoms,
- G denotes glucose,
- t denotes a value ranging from 0 to 3, and is preferably equal to 0, and
- $R_2$ and v are as defined previously.

The degree of polymerization of the alkyl (poly)glycoside(s) as represented, for example, by the subscript v in formula (X) above ranges on average from 1 to 15 and preferably from 1 to 4. This degree of polymerization more particularly ranges from 1 to 2 and even better still from 1.1 to 1.5, on average.

The glycoside bonds between the saccharide units are 1,6- or 1,4-bonds; preferably 1,4-bonds.

The (C14-C30)alkyl (poly)glycosides that may be used in the present invention are preferably (C14-C30)alkyl (poly) glucosides notably represented by the products sold by EVONIK GOLDSCHMIDT under the trade names TEGO CARE CG 90 or TEGO CARE CG 90 MB, the products sold by SEPPIC under the trade names Montanov® 68, Montanov® 68 MB, Montanov® 14 or Montanov® 202, or the products sold by BASF under the name Emulgade® PL 68/50.

Preferably, use may be made of the compounds with the INCI names myristyl glucoside, cetearyl glucoside and/or arachidyl glucoside. The compound with the INCI name cetearyl glucoside is particularly preferred.

Preferably, the (C14-C30)alkyl (poly)glycosides are chosen from (C14-C30)alkyl (poly)glucosides, preferably from (C14-C22)alkyl (poly)glucosides, preferentially (C14-C20) alkyl (poly)glucosides, better still (C16-C18)alkyl (poly) glucosides, even better still cetearyl (poly)glucosides.

Advantageously, the (C14-C30)alkyl (poly)glycosides are present in a total content ranging from 0.01% to 20% by weight, preferably from 0.02% to 10% by weight, preferentially from 0.05% to 5% by weight, better still from 0.07% to 2% by weight, even better still from 0.1% to 1% by weight, relative to the total weight of the composition.

In a preferred embodiment, the composition according to the invention comprises one or more (C16-C18)alkyl (poly) glucosides preferably present in a total content ranging from 0.01% to 20% by weight, preferably from 0.02% to 10% by weight, preferentially from 0.05% to 5% by weight, better still from 0.07% to 2% by weight, even better still from 0.1% to 1% by weight, relative to the total weight of the composition.

Fatty Alcohols

The composition according to the invention comprises one or more fatty alcohols, preferably chosen from C14 to C40 fatty alcohols, in a total content ranging from 8% to 35% by weight, relative to the total weight of the composition, The term "fatty alcohol" means a long-chain aliphatic alcohol comprising from 8 to 40 carbon atoms and comprising at least one hydroxyl group OH. The fatty alcohols according to the invention are non-oxyalkylenated and non-glycerolated.

In particular, the fatty alcohols are different from nonionic surfactants.

Preferably, the fatty alcohols according to the invention are neither (poly)oxyalkylenated or (poly)glycerolated and are different from nonionic surfactants.

The fatty alcohols according to the invention may be saturated or unsaturated, and linear or branched, and include from 8 to 40 carbon atoms.

More preferentially, the fatty alcohols according to the invention are chosen from compounds having the structure R—OH with R denoting a linear or branched, saturated or unsaturated alkyl group optionally substituted with one or more hydroxyl groups, comprising from 8 to 40, better still from 10 to 30, or even from 12 to 24 and even better still from 14 to 22 carbon atoms.

The fatty alcohols may be chosen from solid fatty alcohols and liquid fatty alcohols, and mixtures thereof.

For the purposes of the present invention, the term "solid fatty alcohol" means a fatty alcohol with a melting point of greater than 25° C., preferably greater than or equal to 28° C., more preferentially greater than or equal to 30° C. at atmospheric pressure ($1.013 \times 10^5$ Pa).

The solid fatty alcohols may be chosen from saturated or unsaturated, linear or branched solid fatty alcohols, including from 8 to 40 carbon atoms.

The solid fatty alcohols that may be used according to the invention are preferably chosen from compounds having the structure R—OH with R denoting a saturated linear alkyl group, optionally substituted with one or more hydroxyl groups, comprising from 8 to 40, better still from 10 to 30, or even from 12 to 24 atoms, even better still from 14 to 22 carbon atoms.

The solid fatty alcohols that may be used may be chosen, alone or as a mixture, from:
lauryl alcohol (or 1-dodecanol);
myristyl alcohol (or 1-tetradecanol);
cetyl alcohol (or 1-hexadecanol);
stearyl alcohol (or 1-octadecanol);
arachidyl alcohol (or 1-eicosanol);
behenyl alcohol (or 1-docosanol);
lignoceryl alcohol (or 1-tetracosanol);
ceryl alcohol (or 1-hexacosanol);
montanyl alcohol (or 1-octacosanol);
myricyl alcohol (or 1-triacontanol).

Use will preferably be made, among the mixtures of solid fatty alcohols, of cetyl alcohol, stearyl alcohol and/or mixtures such as cetearyl alcohol.

For the purposes of the present invention, the term "liquid fatty alcohol" means a fatty alcohol with a melting point of less than or equal to 25° C., preferably less than or equal to 20° C. at atmospheric pressure ($1.013 \times 10^5$ Pa).

The liquid fatty alcohols that may be used according to the invention are preferably chosen from compounds having the structure R—OH with R denoting a saturated or unsaturated, linear or branched, preferably unsaturated and/or branched, alkyl group optionally substituted with one or more hydroxyl groups, comprising from 8 to 40, better still from 10 to 30, or even from 12 to 24 and even better still from 14 to 22 carbon atoms.

The liquid fatty alcohols that may be used may be chosen, alone or as a mixture, from oleyl alcohol, linoleyl alcohol, linolenyl alcohol, isocetyl alcohol, isostearyl alcohol, 2-octyl-1-dodecanol, 2-butyloctanol, 2-hexyl-1-decanol, 2-decyl-1-tetradecanol and 2-tetradecyl-1-cetanol, and mixtures thereof, preferably oleyl alcohol will be used.

Preferably, the fatty alcohol(s) is/are chosen from fatty alcohols comprising 14 to 40 carbon atoms, more preferentially 14 to 22 carbon atoms, better still from cetyl alcohol, stearyl alcohol, cetearyl alcohol, oleyl alcohol, and mixtures thereof.

According to one embodiment, the composition according to the invention comprises one or more solid fatty alcohols, preferably one or more solid fatty alcohols comprising 14 to 40 carbon atoms, more preferentially 14 to 22 carbon atoms.

According to another embodiment, the composition according to the invention comprises one or more liquid fatty alcohols, preferably one or more liquid fatty alcohols comprising 14 to 40 carbon atoms, more preferentially 14 to 22 carbon atoms.

According to a preferred embodiment, the composition according to the invention comprises one or more solid fatty alcohols and one or more liquid fatty alcohols, preferably one or more solid fatty alcohols comprising 14 to 40 carbon atoms, more preferentially 14 to 22 carbon atoms and one or more liquid fatty alcohols comprising 14 to 40 carbon atoms, more preferentially 14 to 22 carbon atoms.

Advantageously, the fatty alcohol(s) is/are present in a total content ranging from 8% to 30% by weight, preferably from 8% to 25% by weight and more preferentially from 10% to 20% by weight, relative to the total weight of the composition.

According to one particular embodiment, advantageously the solid fatty alcohol(s) is/are present in a total content ranging from 8% to 30% by weight, preferably from 8% to 25% by weight and more preferentially from 10% to 20% by weight, relative to the total weight of the composition.

In another particular embodiment, advantageously the liquid fatty alcohol(s) is/are present in a total content ranging from 8% to 30% by weight, preferably from 8% to 25% by weight and more preferentially from 10% to 20% by weight, relative to the total weight of the composition.

Fatty Acids

The composition according to the invention further comprises one or more fatty acids.

In the sense of the present invention, by fatty acids is meant free fatty acids, for instance the fatty acids according to the invention are not esterified.

The term "fatty acid" means a long-chain carboxylic acid comprising from 6 to 40 carbon atoms, preferably from 8 to 30 carbon atoms. They may optionally be hydroxylated. These fatty acids are neither oxyalkylenated nor glycerolated.

More preferentially, the fatty acids according to the invention are chosen from compounds of R—C(O)OH structure in which R represents a linear or branched, saturated or unsaturated alkyl group including from 6 to 40 carbon atoms, preferably from 8 to 30 carbon atoms, preferentially from 12 to 24 carbon atoms, better still from 14 to 20 carbon atoms.

The fatty acids may be chosen from solid acids, liquid fatty acids and mixtures thereof.

For the purposes of the present invention, the term "solid fatty acid" means a fatty acid having a melting point above 25° C., preferably above or equal to 28° C., more preferentially above or equal to 30° C. at atmospheric pressure ($1.013 \times 10^5$ Pa).

The solid fatty acids that can be used in the present invention are notably chosen from myristic acid, cetylic acid (or palmitic acid), stearylic acid, arachidic acid, stearic acid, lauric acid, behenic acid, 12-hydroxystearic acid, and mixtures thereof.

Particularly preferably, the solid fatty acid(s) are chosen from lauric acid, myristic acid, palmitic acid (also referred to as cetylic acid) and stearic acid.

For the purposes of the present invention, the term "liquid fatty acid" means a fatty acid having a melting point below or equal to 25° C., preferably below or equal to 20° C. at atmospheric pressure ($1.013 \times 10^5$ Pa).

The liquid fatty acid(s) according to the invention may be chosen from oleic acid, linoleic acid, arachidonic acid, isostearic acid, isostearic acid, isopalmitic acid, and mixtures thereof, preferentially oleic acid.

Preferably, the fatty acid(s) is/are chosen from myristic acid, palmitic acid, stearic acid, oleic acid and mixtures thereof, preferentially the fatty acid is oleic acid.

Advantageously, the fatty acid(s) is/are present in a total content ranging from 0.1% to 15% by weight, preferably from 0.5% to 10%, more preferentially from 1% to 5% by weight, relative to the total weight of the composition.

In one particular embodiment, advantageously the liquid fatty acid(s) is/are present in a total content ranging from 0.1% to 15% by weight, more preferentially from 0.5% to 10%, preferentially from 1% to 5% by weight, relative to the total weight of the composition.

Alkaline Agent

The composition according to the present invention comprises one or more alkaline agents chosen from mineral, organic or hybrid alkaline agents.

Preferably, the composition according to the present invention comprises one or more alkaline agents chosen from mineral, organic or hybrid alkaline agent(s).

For the purposes of the present invention, the terms "alkaline agent" and "basifying agent" are used interchangeably.

The mineral basifying agent(s) are preferably chosen from aqueous ammonia, alkali metal carbonates or bicarbonates such as sodium (hydrogen)carbonate and potassium (hydrogen)carbonate, alkali metal or alkaline-earth metal phosphates such as sodium phosphates or potassium phosphates, sodium or potassium hydroxides, alkali metal or alkaline-earth metal silicates or metasilicates such as sodium metasilicate and mixtures thereof.

The organic basifying agent(s) is/are preferably chosen from alkanolamines, amino acids, organic amines other than alkanolamines, oxyethylenated and/or oxypropylenated ethylenediamines, 1,3-diaminopropane, spermine or spermidine and mixtures thereof.

The term "alkanolamine" is intended to mean an organic amine comprising a primary, secondary or tertiary amine function, and one or more linear or branched $C_1$-$C_8$ alkyl groups bearing one or more hydroxyl radicals.

Particularly suitable for performing the invention are organic amines chosen from alkanolamines such as monoalkanolamines, dialkanolamines or trialkanolamines comprising one to three identical or different C1-C4 hydroxyalkyl radicals.

In particular, the alkanolamine(s) are chosen from monoethanolamine (MEA), diethanolamine, triethanolamine, monoisopropanolamine, diisopropanolamine, N,N-dimethylethanolamine, 2-amino-2-methyl-1-propanol, triisopropanolamine, 2-amino-2-methyl-1,3-propanediol, 3-amino-1,2-propanediol, 3-dimethylamino-1,2-propanediol, tris(hydroxymethyl)aminomethane and mixtures thereof.

Advantageously, the amino acids are basic amino acids comprising an additional amine function. Such basic amino acids are preferably chosen from histidine, lysine, arginine, ornithine and citrulline.

The organic amine may also be chosen from organic amines of heterocyclic type. Besides histidine that has already been mentioned in the amino acids, mention may in particular be made of pyridine, piperidine, imidazole, triazole, tetrazole and benzimidazole. The organic amine may also be chosen from amino acid dipeptides. As amino acid dipeptides that may be used in the present invention, mention may notably be made of carnosine, anserine and balenine. The organic amine may also be chosen from compounds including a guanidine function. As amines of this type other than arginine that may be used in the present invention, mention may notably be made of creatine, creatinine, 1,1-dimethylguanidine, 1,1-diethylguanidine, glycocyamine, metformin, agmatine, n-amidoalanine, 3-guanidinopropionic acid, 4-guanidinobutyric acid and 2-([amino(imino)methyl]amino)ethane-1-sulfonic acid.

Use may be made in particular of guanidine carbonate or monoethanolamine hydrochloride as hybrid compounds.

The alkaline agent(s) that may be used according to the invention is/are preferably chosen from alkanolamines such as monoethanolamine, diethanolamine, triethanolamine; aqueous ammonia, carbonates or bicarbonates such as sodium (hydrogen)carbonate and potassium (hydrogen)carbonate, alkali metal or alkaline-earth metal silicates or metasilicates such as sodium metasilicate and mixtures thereof, more preferentially from aqueous ammonia and alkanolamines, better still from alkanolamines, even better still the alkaline agent is monoethanolamine.

Preferably, the alkaline agent(s) is/are organic.

According to a particular embodiment, the composition according to the invention is free of aqueous ammonia.

Advantageously, the total content of the alkaline agent(s) ranges, preferably, from 0.1% to 40% by weight, relative to the total weight of the composition.

In one preferred embodiment, the total content of the alkaline agent(s) is preferably greater than or equal to 5% by weight, preferentially ranges from 5% to 40% by weight, more preferentially from 6% to 30% by weight, more preferentially still from 8% to 20% by weight, better still from 10% to 15% by weight, relative to the total weight of the composition.

In one particular embodiment, the total content of the alkaline agent(s) chosen from alkanolamines, preferably monoethanolamine, ranges preferably from 0.1% to 40% by weight, relative to the total weight of the composition.

In a preferred embodiment, the total content of the alkaline agent(s) chosen from alkanolamines, preferably monoethanolamine, is preferably greater than or equal to 5% by weight, preferentially ranges from 5% to 40% by weight, more preferentially from 6% to 30% by weight, more preferentially still from 8% to 20% by weight, better still from 10% to 15% by weight, relative to the total weight of the composition.

According to one embodiment, the pH of the composition is between 8 and 13, preferably between 9.0 and 12.

The pH of the composition may be adjusted to the desired value by means of acidic or alkaline agent(s) commonly used in the dyeing of keratin fibres, such as those described hereinabove, or alternatively using buffer systems known to those skilled in the art.

The Dyes

The composition according to the present invention may comprise one or more dyes chosen from oxidation dyes, direct dyes, and mixtures thereof, preferably from oxidation dyes and mixtures thereof.

Preferably, the composition according to the present invention does comprise one or more dyes chosen from oxidation dyes, direct dyes and mixtures thereof. More preferentially, the composition according to the present invention comprises one or more dyes chosen from oxidation dyes and mixtures thereof.

Dyes: Oxidation Dyes.

The oxidation dyes may be chosen from one or more oxidation bases, optionally in combination with one or more couplers.

Preferably, the oxidation dye(s) comprise one or more oxidation bases.

Preferably, the composition according to the invention comprises one or more oxidation bases.

The oxidation bases may be present in the form of salts, solvates and/or solvates of salts.

The addition salts of the oxidation bases present in the composition according to the invention are chosen notably from the addition salts with an acid, such as the hydrochlorides, hydrobromides, sulfates, citrates, succinates, tartrates, lactates, tosylates, benzenesulfonates, methanesulfonates, phosphates and acetates, and the addition salts with a base such as sodium hydroxide, potassium hydroxide, aqueous ammonia, amines or alkanolamines.

Moreover, the solvates of the additional oxidation bases more particularly represent the hydrates of said oxidation bases and/or the combination of said oxidation bases with a linear or branched C1 to C4 alcohol such as methanol, ethanol, isopropanol or n-propanol. Preferably, the solvates are hydrates.

The oxidation bases may be chosen from para-phenylenediamines, bis(phenyl)alkylenediamines, para-aminophenols, ortho-aminophenols and heterocyclic bases and the addition salts thereof, the solvates thereof, and solvates of the salts thereof.

Among the para-phenylenediamines, examples that may be mentioned include para-phenylenediamine, para-tolylenediamine, 2-chloro-para-phenylenediamine, 2,3-dimethyl-para-phenylenediamine, 2,6-dimethyl-para-phenylenediamine, 2,6-diethyl-para-phenylenediamine, 2,5-dimethyl-para-phenylenediamine, N,N-dimethyl-para-phenylenediamine, N,N-diethyl-para-phenylenediamine, N,N-dipropyl-para-phenylenediamine, 4-amino-N,N-diethyl-3-methylaniline, N,N-bis(β-hydroxyethyl)-para-phenylenediamine, 4-N,N-bis(β-hydroxyethyl)amino-2-methylaniline, 4-N,N-bis(β-hydroxyethyl)amino-2-chloroaniline, 2-β-hydroxyethyl-para-phenylenediamine, 2-methoxymethyl-para-phenylenediamine, 2-γ-hydroxypropyl-para-phenylenediamine; 2-fluoro-para-phenylenediamine, 2-isopropyl-para-phenylenediamine, N-(β-hydroxypropyl)-para-phenylenediamine, 2-hydroxymethyl-para-phenylenediamine, N,N-dimethyl-3-methyl-para-phenylenediamine, N-ethyl-N-(β-hydroxyethyl)-para-phenylenediamine, N-(β,γ-dihydroxypropyl)-para-phenylenediamine, N-(4'-aminophenyl)-para-phenylenediamine, N-phenyl-para-phenylenediamine, 2-β-hydroxyethyloxy-para-phenylenediamine, 2-β-acetylaminoethyloxy-para-phenylenediamine, N-(β-methoxyethyl)-para-phenylenediamine, 4-aminophenylpyrrolidine, 2-thienyl-para-phenylenediamine, 2-β-hydroxyethylamino-5-aminotoluene and 3-hydroxy-1-(4'-aminophenyl)pyrrolidine, and the addition salts thereof, the solvates thereof, and solvates of the salts thereof.

Among the para-phenylenediamines mentioned above, para-phenylenediamine, para-tolylenediamine, 2-isopropyl-para-phenylenediamine, 2-β-hydroxyethyl-para-phenylenediamine, 2-methoxymethyl-para-phenylenediamine, 2-γ-hydroxypropyl-para-phenylenediamine, 2-β-hydroxyethyloxy-para-phenylenediamine, 2,6-dimethyl-para-phenylenediamine, 2,6-diethyl-para-phenylenediamine, 2,3-dimethyl-para-phenylenediamine, N,N-bis(β-hydroxyethyl)-para-phenylenediamine, 2-chloro-para-phenylenediamine and 2-β-acetylaminoethyloxy-para-phenylenediamine, and the addition salts thereof, the solvates thereof, and solvates of the salts thereof are particularly preferred.

Among the bis(phenyl)alkylenediamines, examples that may be mentioned include N,N'-bis(β-hydroxyethyl)-N,N'-bis(4'-aminophenyl)-1,3-diaminopropanol, N,N'-bis(β-hydroxyethyl)-N,N'-bis(4'-aminophenyl)ethylenediamine, N,N'-bis(4-aminophenyl)tetramethylenediamine, N,N'-bis(β-hydroxyethyl)-N,N'-bis(4-aminophenyl)tetramethylenediamine, N,N'-bis(4-methylaminophenyl)tetramethylenediamine, N,N'-bis(ethyl)-N,N'-bis(4'-amino-3'-methylphenyl)ethylenediamine and 1,8-bis(2,5-diaminophenoxy)-3,6-dioxaoctane, and the addition salts thereof, the solvates thereof, and solvates of the salts thereof.

Among the para-aminophenols, examples that may be mentioned include para-aminophenol, 4-amino-3-methylphenol, 4-amino-3-fluorophenol, 4-amino-3-chlorophenol, 4-amino-3-hydroxymethylphenol, 4-amino-2-methylphenol, 4-amino-2-hydroxymethylphenol, 4-amino-2-methoxymethylphenol, 4-amino-2-aminomethylphenol, 4-amino-2-(β-hydroxyethylaminomethyl)phenol and 4-amino-2-fluorophenol, and the addition salts thereof, the solvates thereof, and solvates of the salts thereof.

Among the ortho-aminophenols, examples that may be mentioned include 2-aminophenol, 2-amino-5-methylphenol, 2-amino-6-methylphenol and 5-acetamido-2-aminophenol, and the addition salts thereof, solvates thereof and solvates of the salts thereof.

Among the heterocyclic bases, examples that may be mentioned include pyridine derivatives, pyrimidine derivatives and pyrazole derivatives.

Among the pyridine derivatives, mention may be made of the compounds described, for example, in patents GB 1 026 978 and GB 1 153 196, such as 2,5-diaminopyridine, 2-(4-methoxyphenyl)amino-3-aminopyridine, 3,4-diaminopyridine, and the addition salts thereof, the solvates thereof, and solvates of the salts thereof.

Other pyridine oxidation bases that are useful in the present invention are the 3-aminopyrazolo[1,5-a]pyridine oxidation bases or their addition salts described, for example, in patent application FR 2 801 308. Examples that may be mentioned include pyrazolo[1,5-a]pyrid-3-ylamine, 2-acetylaminopyrazolo[1,5-a]pyrid-3-ylamine, 2-(morpholin-4-yl)pyrazolo[1,5-a]pyrid-3-ylamine, 3-aminopyrazolo[1,5-a]pyridine-2-carboxylic acid, 2-methoxypyrazolo[1,5-a]pyrid-3-ylamine, (3-aminopyrazolo[1,5-a]pyrid-7-yl)methanol, 2-(3-aminopyrazolo[1,5-a]pyrid-5-yl)ethanol, 2-(3-aminopyrazolo[1,5-a]pyrid-7-yl)ethanol, (3-aminopyrazolo[1,5-a]pyrid-2-yl)methanol, 3,6-diaminopyrazolo[1,5-a]pyridine, 3,4-diaminopyrazolo[1,5-a]pyridine, pyrazolo[1,5-a]pyridine-3,7-diamine, 7-(morpholin-4-yl)pyrazolo[1,5-a]pyrid-3-ylamine, pyrazolo[1,5-a]pyridine-3,5-diamine, 5-(morpholin-4-yl)pyrazolo[1,5-a]pyrid-3-ylamine, 2-[(3-aminopyrazolo[1,5-a]pyrid-5-yl)(2-hydroxyethyl)amino]ethanol, 2-[(3-aminopyrazolo[1,5-a]pyrid-7-yl)(2-hydroxyethyl)amino]ethanol, 3-aminopyrazolo[1,5-a]pyridin-5-ol, 3-aminopyrazolo[1,5-a]pyridin-4-ol, 3-aminopyrazolo[1,5-a]pyridin-6-ol, 3-aminopyrazolo[1,5-a]pyridin-7-ol and 2-(3-amino-pyrazolo[1,5-a]pyridin-2-yl)oxyethanol, the addition salts thereof, the solvates thereof, and solvates of the salts thereof.

Among the pyrimidine derivatives, mention may be made of the compounds described, for example, in patents DE 2359399, JP 88-169571, JP 05-63124 and EP 0770375 or patent application WO 96/15765, such as 2,4,5,6-tetraaminopyrimidine, 4-hydroxy-2,5,6-triaminopyrimidine, 2-hydroxy-4,5,6-triaminopyrimidine, 2,4-dihydroxy-5,6-diaminopyrimidine, 2,5,6-triaminopyrimidine and the addition salts thereof, and the tautomeric forms thereof, when a tautomeric equilibrium exists.

Among the pyrazole derivatives that may be mentioned are the compounds described in patents DE 3843892 and DE 4133957 and patent applications WO 94/08969, WO 94/08970, FR-A-2 733 749 and DE 195 43 988, such as 4,5-diamino-1-methylpyrazole, 4,5-diamino-1-(β-hydroxyethyl)pyrazole, 3,4-diaminopyrazole, 4,5-diamino-1-(4'-chlorobenzyl)pyrazole, 4,5-diamino-1,3-dimethylpyrazole, 4,5-diamino-3-methyl-1-phenylpyrazole, 4,5-diamino-1-methyl-3-phenylpyrazole, 4-amino-1,3-dimethyl-5-hydrazinopyrazole, 1-benzyl-4,5-diamino-3-methylpyrazole, 4,5-diamino-3-tert-butyl-1-methylpyrazole, 4,5-diamino-1-tert-butyl-3-methylpyrazole, 4,5-diamino-1-(β-hydroxyethyl)-3-methylpyrazole, 4,5-diamino-1-ethyl-3-methylpyrazole, 4,5-diamino-1-ethyl-3-(4'-methoxyphenyl)pyrazole, 4,5-diamino-1-ethyl-3-hydroxymethylpyrazole, 4,5-diamino-3-hydroxymethyl-1-methylpyrazole, 4,5-diamino-3-hydroxymethyl-1-isopropylpyrazole, 4,5-diamino-3-methyl-1-isopropylpyrazole, 4-amino-5-(2'-aminoethyl)amino-1,3-dimethylpyrazole, 3,4,5-triaminopyrazole, 1-methyl-3,4,5-triaminopyrazole, 3,5-diamino-1-methyl-4-methylaminopyrazole and 3,5-diamino-4-(β-hydroxyethyl)amino-1-methylpyrazole, the addition salts thereof, the solvates thereof, and solvates of the salts thereof. Use may also be made of 4,5-diamino-1-(β-methoxyethyl)pyrazole.

Use will preferably be made of a 4,5-diaminopyrazole and even more preferentially of 4,5-diamino-1-(β-hydroxyethyl) pyrazole and/or one of its salts, solvates or solvates of the salts thereof.

Pyrazole derivatives that may also be mentioned include diamino-N,N-dihydropyrazolopyrazolones and notably those described in patent application FR-A-2 886 136, such as the following compounds and the addition salts thereof: 2,3-diamino-6,7-dihydro-1H,5H-pyrazolo[1,2-a]pyrazol-1-one, 2-amino-3-ethylamino-6,7-dihydro-1H,5H-pyrazolo[1,2-a]pyrazol-1-one, 2-amino-3-isopropylamino-6,7-dihydro-1H,5H-pyrazolo[1,2-a]pyrazol-1-one, 2-amino-3-(pyrrolidin-1-yl)-6,7-dihydro-1H,5H-pyrazolo[1,2-a]pyrazol-1-one, 4,5-diamino-1,2-dimethyl-1,2-dihydropyrazol-3-one, 4,5-diamino-1,2-diethyl-1,2-dihydropyrazol-3-one, 4,5-diamino-1,2-di(2-hydroxyethyl)-1,2-dihydropyrazol-3-one, 2-amino-3-(2-hydroxyethyl)amino-6,7-dihydro-1H,5H-pyrazolo[1,2-a]pyrazol-1-one, 2-amino-3-dimethylamino-6,7-dihydro-1H,5H-pyrazolo[1,2-a]pyrazol-1-one, 2,3-diamino-5,6,7,8-tetrahydro-1H,6H-pyridazino[1,2-a]pyrazol-1-one, 4-amino-1,2-diethyl-5-(pyrrolidin-1-yl)-1,2-dihydropyrazol-3-one, 4-amino-5-(3-dimethylaminopyrrolidin-1-yl)-1,2-diethyl-1,2-dihydropyrazol-3-one or 2,3-diamino-6-hydroxy-6,7-dihydro-1H,5H-pyrazolo[1,2-a]pyrazol-1-one, the salts thereof, solvates thereof and/or solvates of the salts thereof.

Use will preferably be made of 2,3-diamino-6,7-dihydro-1H,5H-pyrazolo[1,2-a]pyrazol-1-one and/or one of its salts, solvates or solvates of the salts thereof.

Heterocyclic bases that will preferentially be used include 4,5-diamino-1-(3-hydroxyethyl)pyrazole and/or 2,3-diamino-6,7-dihydro-1H,5H-pyrazolo[1,2-a]pyrazol-1-one and/or 2-(3-aminopyrazolo[1,5-a]pyridin-2-yl)oxyethanol and/or one of their salts, solvates or solvates of the salts thereof.

Preferably, the oxidation base(s) are chosen from paraphenylenediamines, bis(phenyl)alkylenediamines, para-aminophenols, ortho-aminophenols, heterocyclic bases, and the corresponding addition salts, the solvates thereof and the solvates of the salts thereof, and mixtures thereof; more preferentially from 2-methoxymethyl-para-phenylenediamine, 2-β-hydroxyethyl-para-phenylenediamine, 2-7-hydroxypropyl-para-phenylenediamine, and the addition salts thereof, the solvates thereof and/or the solvates of the salts thereof, and mixtures thereof.

In a particular embodiment, the composition according to the invention is free of oxidation bases chosen from para-phenylenediamine, para-toluenediamine, addition salts thereof, solvates thereof and solvates of the salts thereof.

The oxidation dye(s) may also comprise one or more couplers, which may be chosen from the couplers conventionally used for the dyeing of keratin fibres.

Preferably, the composition according to the invention comprises one or more couplers.

Preferably, the couplers are chosen from meta-phenylenediamines, meta-aminophenols, meta-diphenols, naphthalene-based couplers and heterocyclic couplers, and also the addition salts thereof, the solvates thereof, and/or the solvates of the salts thereof.

Examples that may be mentioned include 1,3-dihydroxybenzene, 1,3-dihydroxy-2-methylbenzene, 4-chloro-1,3-dihydroxybenzene, 1-hydroxy-3-aminobenzene, 1-methyl-2-hydroxy-4-β-hydroxyethylaminobenzene, 4-amino-2-hydroxytoluene, 5-amino-6-chloro-2-methylphenol, 2,4-diamino-1-(β-hydroxyethyloxy)benzene, 2-amino-4-(β-hydroxyethylamino)-1-methoxybenzene, 1,3-diaminobenzene, 1,3-bis(2,4-diaminophenoxy)propane, 3-ureidoaniline, 3-ureido-1-dimethylaminobenzene, sesamol, 1-β-hydroxyethylamino-3,4-methylenedioxybenzene, α-naphthol, 2-methyl-1-naphthol, 6-hydroxyindole, 4-hydroxyindole, 4-hydroxy-N-methylindole, 5-methoxy-6-hydroxyindole, 2-amino-3-hydroxypyridine, 6-hydroxybenzomorpholine, 2-amino-4-hydroxyethylaminoanisole, 3-amino-6-methoxy-2-methylaminopyridine, 3,5-diamino-2,6-dimethoxypyridine, 1-N-(β-hydroxyethyl)amino-3,4-methylenedioxybenzene, 2,6-bis(β-hydroxyethylamino)toluene, 6-hydroxyindoline, 2,6-dihydroxy-4-methylpyridine, 2-chloro-3,5-diaminopyridine, 2-chloro-3,5-diamino-6-methoxypyridine, 2-chloro-3,5-diamino-6-methylpyridine, 1-H-3-methylpyrazol-5-one, 1-phenyl-3-methylpyrazol-5-one, 4-(3,5-diaminopyridin-2-yl)-1-(2-hydroxyethyl)-1-methylpiperazin-1-ium chloride, 2,6-dimethylpyrazolo[1,5-b]-1,2,4-triazole, 2,4,6-trimethoxyaniline hydrochloride, 2,6-dimethyl[3,2-c]-1,2,4-triazole, 6-methylpyrazolo[1,5-a]benzimidazole and 2,6-diaminopyrazine, the addition salts thereof and/or the solvates thereof, and/or the solvates of the salts thereof, and mixtures thereof.

Preferably, the coupler(s) used in the invention are chosen from 1,3-dihydroxybenzene, 1,3-dihydroxy-2-methylbenzene, 4-chloro-1,3-dihydroxybenzene, 1-hydroxy-3-aminobenzene, 1-methyl-2-hydroxy-4-β-hydroxyethylaminobenzene, 4-amino-2-hydroxytoluene, 5-amino-6-chloro-2-methylphenol, 2,4-diamino-1-(β-hydroxyethyloxy)benzene, α-naphthol, 6-hydroxyindole, 2-amino-3-hydroxypyridine, 6-hydroxybenzomorpholine, 3-amino-6-methoxy-2-methylaminopyridine, 2-amino-4-hydroxyethylaminoanisole, hydroxyethyl-3,4-methylenedioxyaniline and 2-amino-5-ethylphenol, the addition salts thereof and/or the solvates thereof and/or solvates of the salts thereof, and mixtures thereof.

Even more preferentially, the coupler(s) used in the invention are chosen from 3-amino-6-methoxy-2-methylaminopyridine, 6-hydroxybenzomorpholine, 2,4-diamino-1-(β-hydroxyethyloxy)benzene, 2-amino-3-hydroxypyridine, 5-amino-6-chloro-2-methylphenol, 1-methyl-2-hydroxy-4-β-hydroxyethylaminobenzene, 2-amino-4-hydroxyethylaminoanisole, hydroxyethyl-3,4-methylenedioxyaniline, 2-amino-5-ethylphenol and 1-hydroxy-3-aminobenzene, the addition salts thereof and/or the solvates thereof and/or solvates of the salts thereof, and mixtures thereof.

In general, the addition salts of the couplers that may be used in the context of the invention are in particular chosen from addition salts with an acid, such as hydrochlorides, hydrobromides, sulfates, citrates, succinates, tartrates, lactates, tosylates, benzenesulfonates, phosphates and acetates, and the addition salts with a base such as sodium hydroxide, potassium hydroxide, aqueous ammonia, amines or alkanolamines.

Moreover, the solvates more particularly represent the hydrates of these couplers and/or the combination of these couplers with a linear or branched C1 to C4 alcohol such as methanol, ethanol, isopropanol or n-propanol. Preferably, the solvates are hydrates.

Preferably, the oxidation dyes chosen from couplers are chosen from 6-hydroxybenzomorpholine, 2,4-diamino-1-(β-hydroxyethyloxy)benzene, 2-amino-3-hydroxypyridine, 5-amino-6-chloro-2-methylphenol, 1-methyl-2-hydroxy-4-β-hydroxyethylaminobenzene, 2-amino-4-hydroxyethylaminoanisole, hydroxyethyl-3,4-methylenedioxyaniline, 2-amino-5-ethylphenol, 1-hydroxy-3-aminobenzene, the addition salts thereof, the salts thereof and/or solvates of the salts thereof, and mixtures thereof.

Better still, the coupler(s) are chosen from: 6-hydroxybenzomorpholine, the addition salts thereof, the solvates thereof and/or the solvates of the salts thereof, hydroxyethyl-3,4-methylenedioxyaniline, the addition salts thereof, the solvates thereof and/or the solvates of the salts thereof, 2-amino-5-ethylphenol, the addition salts thereof, the solvates thereof and/or the solvates of the salts thereof, and mixtures thereof.

In one particular embodiment, the composition according to the invention is free of oxidation couplers chosen from resorcinol, 2-methylresorcinol, 4-chlororesorcinol, the addition salts thereof, the solvates thereof and the solvates of the salts thereof.

Advantageously, when they are present, the oxidation dyes chosen from oxidation bases are present in a total content ranging from 0.0001% to 10% by weight, preferably from 0.005% to 7% by weight, more preferentially from 0.1% to 4% by weight, relative to the total weight of the composition.

Advantageously, when they are present, the oxidation dyes chosen from couplers are present in a total content ranging from 0.0001% to 10% by weight, preferably from 0.005% to 7% by weight, more preferentially from 0.1% to 4% by weight, relative to the total weight of the composition.

Advantageously, when they are present, the oxidation dyes are present in a total content ranging from 0.0001% to 10% by weight, preferably from 0.005% to 7% by weight, more preferentially from 0.1% to 4% by weight, relative to the total weight of the composition.

Dyes: Direct Dyes

The term "direct dye" means natural and/or synthetic dyes, other than oxidation dyes. These are dyes that will spread superficially on the fibre.

The synthetic direct dyes are, for example, chosen from the dyes conventionally used for direct dyeing, and among which mention may be made of all the aromatic and/or non-aromatic dyes that are commonly used, such as nitrobenzene, azo, hydrazono, nitro(hetero)aryl, tri(hetero)arylmethane, (poly)methine, carbonyl, azine, porphyrin, metalloporphyrin, quinone and in particular anthraquinone, indoamine and phthalocyanine direct dyes, and mixtures thereof.

Among the nitrobenzene direct dyes, mention may be made of: 1,4-diamino-2-nitrobenzene, 1-amino-2-nitro-4-β-hydroxyethylaminobenzene, 1-amino-2-nitro-4-bis(β-hydroxyethyl)aminobenzene, 1,4-bis(β-hydroxyethylamino)-2-nitrobenzene, 1-β-hydroxyethylamino-2-nitro-4-bis(β-hydroxyethylamino)benzene, 1-β-hydroxyethylamino-2-nitro-4-aminobenzene, 1-β-hydroxyethylamino-2-nitro-4-(ethyl)(β-hydroxyethyl)aminobenzene, 1-amino-3-methyl-4-β-hydroxyethylamino-6-nitrobenzene, 1-amino-2-nitro-4-β-hydroxyethylamino-5-chlorobenzene, 1,2-diamino-4-nitrobenzene, 1-amino-2-β-hydroxyethylamino-5-nitrobenzene, 1,2-bis(β-hydroxyethylamino)-4-nitrobenzene, 1-amino-2-tris(hydroxymethyl)methylamino-5-nitrobenzene, 1-hydroxy-2-amino-5-nitrobenzene, 1-hydroxy-2-amino-4-nitrobenzene, 1-hydroxy-3-nitro-4-aminobenzene, 1-hydroxy-2-amino-4,6-dinitrobenzene, 1-β-hydroxyethyloxy-2-β-hydroxyethylamino-5-nitrobenzene, 1-methoxy-2-β-hydroxyethylamino-5-nitrobenzene, 1-β-hydroxyethyloxy-3-methylamino-4-nitrobenzene, 1-γ,γ-dihydroxypropyloxy-3-methylamino-4-nitrobenzene, 1-β-hydroxyethylamino-4-γ,γ-dihydroxypropyloxy-2-nitrobenzene, 1-β,γ-dihydroxypropylamino-4-trifluoromethyl-2-nitrobenzene, 1-β-hydroxyethylamino-4-trifluoromethyl-2-nitrobenzene, 1-β-hydroxyethylamino-3-methyl-2-nitrobenzene, 1-β-aminoethylamino-5-methoxy-2-nitrobenzene, 1-hydroxy-2-chloro-6-ethylamino-4-nitrobenzene, 1-hydroxy-2-chloro-6-amino-4-nitrobenzene, 1-hydroxy-6-bis(β-hydroxyethyl)amino-3-nitrobenzene, 1-β-hydroxyethylamino-2-nitrobenzene, 1-hydroxy-4-β-hydroxyethylamino-3-nitrobenzene.

Among the azo direct dyes, mention may be made of: Basic Red 51, Basic Orange 31, Disperse Red 17, Acid Yellow 9, Acid Black 1, Basic Red 22, Basic Red 76, Basic Yellow 57, Acid Yellow 36, Acid Orange 7, Acid Red 33, Acid Red 35, Acid Yellow 23, Acid Orange 24, Disperse Black 9, Basic Brown 16, Basic Brown 17.

Among the hydrazono direct dyes, mention may be made of: Basic Yellow 87.

Among the nitroaryl direct dyes, mention may be made of: HC Blue 2, HC Yellow 2, HC Red 3,4-hydroxypropylamino-3-nitrophenol, N,N'-bis(2-hydroxyethyl)-2-nitrophenylenediamine.

Among the triarylmethane direct dyes, mention may be made of: Basic Violet 1, Basic Violet 2, Basic Violet 3, Basic Violet 4, Basic Violet 14, Basic Blue 1, Basic Blue 7, Basic Blue 26, Basic Green 1, Basic Blue 77 (also known as HC Blue 15), Acid Blue 1; Acid Blue 3; Acid Blue 7, Acid Blue 9; Acid Violet 49; Acid Green 3; Acid Green 5; Acid Green 50.

Among the quinone direct dyes, mention may be made of: Disperse Red 15, Solvent Violet 13, Acid Violet 43, Disperse Violet 1, Disperse Violet 4, Disperse Blue 1, Disperse Violet 8, Disperse Blue 3, Disperse Red 11, Acid Blue 62, Disperse Blue 7, Basic Blue 22, Disperse Violet 15, Basic Blue 99, and also the following compounds: 1-N-methylmorpholiniumpropylamino-4-hydroxyanthraquinone, 1-aminopropylamino-4-methylaminoanthraquinone, 1-aminopropylaminoanthraquinone, 5-β-hydroxyethyl-1,4-diaminoanthraquinone, 2-aminoethylaminoanthraquinone, 1,4-bis(β,γ-dihydroxypropylamino)anthraquinone, Acid Blue 25, Acid Blue 43, Acid Blue 78, Acid Blue 129, Acid Blue 138, Acid Blue 140, Acid Blue 251, Acid Green 25, Acid Green 41, Acid Violet 42, Mordant Red 3, Acid Black 48, HC Blue 16.

Among the azine direct dyes, mention may be made of: Basic Blue 17, Basic Red 2.

Among the indoamine direct dyes, mention may be made of: 2-β-hydroxyethlyamino-5-[bis(β-4'-hydroxyethyl)amino]anilino-1,4-benzoquinone, 2-β-hydroxyethylamino-5-(2'-methoxy-4'-amino)anilino-1,4-benzoquinone, 3-N-(2'-chloro-4'-hydroxy)phenylacetylamino-6-methoxy-1,4-benzoquinoneimine, 3-N-(3'-chloro-4'-methylamino)phenylureido-6-methyl-1,4-benzoquinoneimine, 3-[4'-N-(ethylcarbamylmethyl)amino]phenylureido-6-methyl-1,4-benzoquinoneimine.

The natural direct dyes are chosen, for example, from lawsone, juglone, indigo, leuco indigo, indirubin, isatin, hennotannic acid, alizarin, carthamine, morin, purpurin, carminic acid, kermesic acid, laccaic acid, purpurogallin, protocatechaldehyde, curcumin, spinulosin, apigenidin, orceins, carotenoids, betanin, chlorophylls, chlorophyllines, monascus, polyphenols or ortho-diphenols.

Among the ortho-diphenols that are useful according to the invention, mention may be made of: catechin, quercetin, brazilin, haematein, haematoxylin, chlorogenic acid, caffeic acid, gallic acid, L-DOPA, cyanidin, (−)-epicatechin, (−)-epigallocatechin, (−)-epigallocatechin 3-gallate (EGCG), isoquercetin, pomiferin, esculetin, 6,7-dihydroxy-3-(3-hydroxy-2,4-dimethoxyphenyl)coumarin, santalin A and B, mangiferin, butein, maritimetin, sulfuretin, robtein, betanidin, pericampylinone A, theaflavin, proanthocyanidin A2, proanthocyanidin B2, proanthocyanidin C1, procyanidins DP 4-8, tannic acid, purpurogallin, 5,6-dihydroxy-2-methyl-1,4-naphthoquinone, alizarin, wedelolactone and natural extracts containing same.

When the composition comprises at least one direct dye, they are preferably present in a total content ranging from 0.001% to 20% by weight, preferably from 0.005% to 15% by weight, more preferentially from 0.01% to 10% by weight, better still from 0.05% to 5%, and even better still from 0.1% to 3% by weight, relative to the weight of the composition.

Preferably, the composition according to the invention comprises one or more dyes chosen from oxidation dyes and direct dyes, more preferentially chosen from oxidation dyes.

Thickening Polymers

The composition according to the invention may comprise at least one thickening polymer, preferably chosen from polysaccharides, more preferentially from anionic polysaccharides.

Preferably, the composition according to the invention comprises one or more thickening polymer(s), preferably chosen from polysaccharides, more preferentially from anionic polysaccharides.

The term "polysaccharides" means polymers which contain at least 11 monosaccharide units. Preferentially, the polysaccharides of the invention include between 20 and 100,000 monosaccharide units.

The anionic polysaccharides according to the invention comprise one or more anionic or anionizable groups, and do not comprise any cationic or cationizable groups.

The anionic polysaccharides that are useful according to the invention may be chosen from those derived from the following sugars: glucose; galactose; arabinose; rhamnose; mannose; xylose; fucose; anhydrogalactose; galacturonic acid; glucuronic acid; mannuronic acid; galactose sulfate; anhydrogalactose sulfate.

The polymers bearing sugar units of the invention may be natural or synthetic.

According to a particular embodiment, the anionic polysaccharides that are useful according to the invention are chosen from native gums such as:
- tree or shrub exudates, for instance: acacia gum (branched polymer of galactose, arabinose, rhamnose and glucuronic acid); ghatti gum (polymer derived from arabinose, galactose, mannose, xylose and glucuronic acid); karaya gum (polymer derived from galacturonic acid, galactose, rhamnose and glucuronic acid); gum tragacanth (polymer of galacturonic acid, galactose, fucose, xylose and arabinose);
- gums derived from algae, such as: alginates (polymers of mannuronic acid and glucuronic acid); carrageenans and furcellerans (polymers of galactose sulfate and anhydrogalactose sulfate);
- microbial gums such as: xanthan gums (polymer of glucose, mannose acetate, mannose/pyruvic acid and glucuronic acid); gellan gums (polymer of partially acylated glucose, rhamnose and glucuronic acid).

For the purposes of the present invention, "microbial gums" is intended to mean substances synthesized by fermentation of sugars by microorganisms.

According to a preferred embodiment, the anionic polysaccharides that are useful according to the invention are chosen from anionic gums, better still from anionic microbial gums, more preferentially from xanthan gums.

The total content of thickening polymers as defined previously, when it/they is/are present in the composition according to the invention, preferably ranges from 0.01% to 10% by weight relative to the total weight of the composition, preferably from 0.05% to 8% by weight, better still from 0.1% to 5% by weight relative to the total weight of the composition.

The total content of anionic polysaccharides as defined previously, when it/they is/are present in the composition according to the invention, preferably ranges from 0.01% to 10% by weight relative to the total weight of the composition, preferably from 0.05% to 8% by weight, better still from 0.1% to 5% by weight relative to the total weight of the composition.

According to one embodiment, the total content of the anionic microbial gums as defined previously ranges preferably from 0.01% to 10% by weight relative to the total weight of the composition, preferably from 0.05% to 5% by weight, better still from 0.1% to 2% by weight relative to the total weight of the composition.

Sequestrants

The composition according to the invention may comprise at least one sequestrant (or chelating agent).

Preferably, the composition according to the invention comprises one or more sequestrants.

The definition of a "sequestrant" (or "chelating agent") is well known to those skilled in the art and refers to a compound or a mixture of compounds that are capable of forming a chelate with a metal ion. A chelate is an inorganic complex in which a compound (the sequestrant or chelating agent) is coordinated to a metal ion, i.e. it forms one or more bonds with the metal ion (formation of a ring including the metal ion).

A sequestrant (or chelating agent) generally comprises at least two electron-donating atoms which enable the formation of bonds with the metal ion.

Within the context of the present invention, the sequestrant(s) may be chosen from carboxylic acids, preferably aminocarboxylic acids, phosphonic acids, preferably aminophosphonic acids, polyphosphoric acids, preferably linear polyphosphoric acids, salts thereof, and derivatives thereof.

The salts are in particular alkali metal, alkaline-earth metal, ammonium and substituted ammonium salts.

The following compounds may be mentioned as examples of chelating agents based on carboxylic acids: diethylenetriaminepentaacetic acid (DTPA), ethylenediaminedisuccinic acid (EDDS) and trisodium ethylenediamine disuccinate such as Octaquest E30 from Octel, ethylenediaminetetraacetic acid (EDTA) and salts thereof such as disodium EDTA, tetrasodium EDTA, ethylenediamine-N,N'-diglutaric acid (EDDG), glycinamide-N,N'-disuccinic acid (GADS), 2-hydroxypropylenediamine-N,N'-disuccinic acid (HPDDS), ethylenediamine-N,N'-bis(ortho-hydroxyphenylacetic acid) (EDDHA), N,N'-bis(2-hydroxybenzyl)ethylenediamine-N,N'-diacetic acid (HBED), nitrilotriacetic acid (NTA), methylglycinediacetic acid (MGDA), N-2-hydroxyethyl-N,N-diacetic acid and glyceryliminodiacetic acid (as described in documents EP-A-317 542 and EP-A-399 133), iminodiacetic acid-N-2-hydroxypropylsulfonic acid and aspartic acid-N-carboxymethyl-N-2-hydroxypropyl-3-sulfonic acid (as described in EP-A-516 102), beta-alanine-N,N'-diacetic acid, aspartic acid-N,N'-diacetic acid, and aspartic acid-N-monoacetic acid (described in EP-A-509 382), chelating agents based on iminodisuccinic acid (IDSA) (as described in EP-A-509 382), ethanoldiglycine acid, phosphonobutane tricarboxylic acid such as the compound sold by Bayer under the reference Bayhibit AM, N,N-dicarboxymethylglutamic acid and salts thereof such as tetrasodium glutamate diacetate (GLDA) such as Dissolvine GL38 or 45S from Akzo Nobel.

The following compounds may be mentioned as examples of chelating agents based on mono- or polyphosphonic acid: diethylenetriaminepenta(methylene phosphonic acid) (DTPMP), ethane-1-hydroxy-1,1,2-triphosphonic acid (E1HTP), ethane-2-hydroxy-1,1,2-triphosphonic acid (E2HTP), ethane-1-hydroxy-1,1-triphosphonic acid (EHDP), ethane-1,1,2-triphosphonic acid (ETP), ethylenediaminetetramethylene phosphonic acid (EDTMP), hydroxyethane-1,1-diphosphonic acid (HEDP, or etidronic acid), and salts such as disodium etidronate, tetrasodium etidronate.

The following compounds may be mentioned as examples of chelating agents based on polyphosphoric acid: sodium tripolyphosphate (STP), tetrasodium diphosphate, hexametaphosphoric acid, sodium metaphosphate, phytic acid.

According to one embodiment, the sequestrant(s) that are useful according to the invention are phosphorus-based sequestrants, i.e. sequestrants which comprise one or more phosphorus atoms, preferably at least two phosphorus atoms.

The phosphorus-based sequestrant(s) used in the composition according to the invention are preferably chosen from:
inorganic phosphorus-based derivatives preferably chosen from alkali metal or alkaline-earth metal, preferably alkali metal, phosphates and pyrophosphates, such as sodium pyrophosphate, potassium pyrophosphate, sodium pyrophosphate decahydrate; and alkali metal or alkaline-earth metal, preferably alkali metal, polyphosphates, such as sodium hexametaphosphate, sodium polyphosphate, sodium tripolyphosphate, sodium trimetaphosphate; which are optionally hydrated, and mixtures thereof;
organic phosphorus-based derivatives, such as organic (poly)phosphates and (poly)phosphonates, such as etidronic acid and/or alkali metal or alkaline-earth metal salts thereof, for instance tetrasodium etidronate, disodium etidronate, and mixtures thereof.

Preferably, the phosphorus-based sequestrant(s) is (are) chosen from linear or cyclic compounds comprising at least two phosphorus atoms bonded together covalently via at least one linker L comprising at least one oxygen atom and/or at least one carbon atom.

The phosphorus-based sequestrant(s) may be chosen from inorganic phosphorus-based derivatives, preferably comprising at least two phosphorus atoms. More preferentially, the phosphorus-based sequestrant(s) is (are) chosen from alkali metal or alkaline-earth metal pyrophosphates, better still from alkali metal pyrophosphates, in particular sodium pyrophosphate (also known as tetrasodium pyrophosphate).

The phosphorus-based sequestrant(s) may be chosen from organic phosphorus-based derivatives, preferably comprising at least two phosphorus atoms. More preferentially, the phosphorus-based sequestrant(s) is (are) chosen from etidronic acid (also known as 1-hydroxyethane-1,1-diphosphonic acid) and/or alkali metal or alkaline-earth metal, preferably alkali metal, salts thereof, for instance tetrasodium etidronate and disodium etidronate.

Thus, preferably, the phosphorus-based sequestrant(s) are chosen from alkali metal pyrophosphates, etidronic acid and/or alkali metal salts thereof, and a mixture of these compounds.

Particularly preferably, the phosphorus-based sequestrant(s) are chosen from tetrasodium etidronate, disodium etidronate, etidronic acid, tetrasodium pyrophosphate, and a mixture of these compounds.

According to the present invention, the sequestrants are preferably chosen from diethylenetriaminepentaacetic acid (DTPA) and salts thereof, diethylenediaminetetraacetic acid (EDTA) and salts thereof, ethylenediaminedisuccinic acid (EDDS) and salts thereof, etidronic acid and salts thereof, N,N-dicarboxymethylglutamic acid and salts thereof (GLDA), and mixtures thereof.

More preferentially, the sequestrant(s) are chosen from N,N-dicarboxymethylglutamic acid and salts thereof (GLDA), and mixtures thereof.

Among the salts of these compounds, the alkali metal salts and notably the sodium or potassium salts are preferred.

When the composition comprises one or more sequestrants, the total content of the sequestrant(s) preferably ranges from 0.001% to 15% by weight, more preferentially from 0.005% to 10% by weight, better still from 0.01% to 8% by weight, even better still from 0.05% to 5% by weight, relative to the total weight of the composition.

Solvents

The composition according to the invention may also comprise at least one organic solvent.

Examples of organic solvents that may be mentioned include linear or branched $C_2$ to $C_4$ alkanols, such as ethanol, propanol and isopropanol; polyols and polyol ethers, for instance 2-butoxyethanol, propylene glycol, 1,3-propanediol, dipropylene glycol, glycerol, propylene glycol monomethyl ether, diethylene glycol monoethyl ether and monomethyl ether, and also aromatic alcohols or ethers, for instance benzyl alcohol or phenoxyethanol, and mixtures thereof.

Preferably, the solvent(s) are chosen from glycerol and 1,3-propanediol.

The organic solvent(s) may be present in an amount ranging from 0.01% to 30% by weight, preferably ranging from 2% to 25% by weight, relative to the total weight of the composition.

In addition, the composition according to the invention is preferably an aqueous composition. The composition preferably comprises water in an amount of greater than or equal to 5% by weight, preferably greater than or equal to 10% by weight, and better still greater than or equal to 15% by weight, relative to the total weight of the composition.

Preferably, the content of water ranges from 15% to 80% by weight, preferentially from 30% to 70% by weight and better still from 40% to 60% by weight.

Chemical Oxidizing Agents

The composition according to the invention may optionally additionally comprise one or more chemical oxidizing agents.

According to a particular embodiment, the composition according to the invention comprises one or more chemical oxidizing agents.

According to another particular embodiment, the composition according to the invention does not comprise chemical oxidizing agents.

According to this embodiment, the composition according to the invention is preferably mixed at the moment of use with at least one composition comprising one or more chemical oxidizing agents.

For the purposes of the present invention, the term "chemical oxidizing agent" means an oxidizing agent other than atmospheric oxygen.

The chemical oxidizing agent(s) (or bleaching agents) which may be used in the present invention may be chosen from hydrogen peroxide, urea hydrogen peroxide, alkali metal bromates, persalts, such as perborates and persulfates, in particular sodium persulfate, potassium persulfate and ammonium persulfate, peracids and oxidase enzymes (with their optional cofactors), among which mention may be made of peroxidases, 2-electron oxidoreductases, such as uricases, and 4-electron oxygenases, such as laccases, and mixtures thereof; more preferentially, the chemical oxidizing agent(s) is/are chosen from hydrogen peroxide, persalts, and mixtures thereof, more preferably the chemical oxidizing agent is hydrogen peroxide.

Preferably, when they are present in the composition according to the invention, the chemical oxidizing agent(s) is/are present in a total content ranging from 0.1% to 35% by weight, more preferentially from 0.5% to 25% by weight, more preferentially still from 1% to 15% by weight, relative to the weight of the composition.

According to a preferred embodiment, when they are present in the composition according to the invention, the chemical oxidizing agent(s) chosen from hydrogen peroxide, persalts and mixtures thereof is/are present in a total content ranging from 0.1% to 35% by weight, more preferentially from 0.5% to 25% by weight, more preferentially still from 1% to 15% by weight, relative to the weight of the composition.

Additives

The composition according to the invention may contain any adjuvant or additive usually used other than the compounds described previously.

Among the additives which may be contained in the composition according to the invention, mention may be made of reducing agents, softeners, antifoams, moisturizers, UV-screening agents, peptizers, solubilizers, fragrances, anionic surfactants other than fatty acids, and cationic, amphoteric or zwitterionic surfactants, anionic polymers other than anionic polysaccharides and cationic, nonionic or amphoteric polymers or mixtures thereof, antidandruff agents, anti-seborrhoeic agents, vitamins and provitamins including panthenol, sunscreens, plasticizers, solubilizers, acidifying agents, mineral or organic thickeners, in particular polymeric thickeners, antioxidants, hydroxy acids and preservatives.

Needless to say, a person skilled in the art will take care to select this or these optional additional compounds such that the advantageous properties intrinsically associated with the composition according to the invention are not, or are not substantially, adversely affected by the envisaged addition(s).

The above additives may generally be present in an amount, for each of them, of between 0 and 20% by weight relative to the total weight of the composition.

Process

The present invention also relates to a process for dyeing and/or lightening keratin fibres, in particular human keratin fibres such as the hair, wherein, applied to said fibres, is a composition comprising:
one or more (C14-C30)alkyl (poly)glycosides,
from 8% to 35% by weight of one or more fatty alcohols, relative to the total weight of the composition,
one or more fatty acids,
one or more alkaline agents,
optionally one or more dyes chosen from oxidation dyes, direct dyes, and mixtures thereof.

In particular, the present invention also relates to a process for dyeing keratin fibres, in particular human keratin fibres such as the hair, wherein, applied to said fibres, is a composition comprising:
one or more (C14-C30)alkyl (poly)glycosides,
from 8% to 35% by weight of one or more fatty alcohols, relative to the total weight of the composition,
one or more fatty acids,
one or more alkaline agents,
one or more dyes chosen from oxidation dyes, direct dyes and mixtures thereof.

In other words, the dyeing process comprises at least the application of a composition according to the invention comprising one or more dyes chosen from oxidation dyes, direct dyes and mixtures thereof, preferably from oxidation dyes.

In particular, the dyeing process comprises at least one step of applying a composition as defined previously.

Preferably, the composition according to the invention is a composition for dyeing keratin fibres, such as the hair. Thus, preferably, the composition according to the present invention comprises one or more dyes chosen from oxidation dyes, direct dyes and mixtures thereof as described previously, preferably from oxidation dyes.

Preferably, the dyeing process comprises at least the application to said keratin fibres of at least one composition according to the invention comprising one or more dyes chosen from oxidation dyes, direct dyes and mixtures thereof, preferably from oxidation dyes, in the presence of one or more chemical oxidizing agents, as defined previously, preferably hydrogen peroxide.

According to one particular embodiment, the process comprises at least the use of a composition according to the invention and the use of a composition comprising one or more oxidizing agents as defined previously, preferably hydrogen peroxide.

Preferably, the dyeing and/or lightening process comprises at least the application of a composition according to the invention comprising:
one or more (C14-C30)alkyl (poly)glycosides, as defined previously,
from 8% to 35% by weight of one or more fatty alcohols, relative to the total weight of the composition, as defined previously,
one or more fatty acids, as defined previously,
one or more alkaline agents, as defined previously,
optionally one or more dyes chosen from oxidation dyes, direct dyes, and mixtures thereof, as defined previously,
one or more oxidizing agents as defined previously, preferably hydrogen peroxide.

Preferably, the dyeing process comprises at least the application of a composition according to the invention comprising:
one or more (C14-C30)alkyl (poly)glycosides, as defined previously,
from 8% to 35% by weight of one or more fatty alcohols, relative to the total weight of the composition, as defined previously,
one or more fatty acids, as defined previously,
one or more alkaline agents, as defined previously,
one or more dyes chosen from oxidation dyes, direct dyes, and mixtures thereof, as defined previously,
one or more oxidizing agents as defined previously, preferably hydrogen peroxide.

According to a particular embodiment, the dyeing and/or lightening process comprises at least the application, to said fibres, of a composition obtained by mixing, at the moment of use:
at least one composition, as defined above, comprising:
one or more (C14-C30)alkyl (poly)glycosides,
from 8% to 35% by weight of one or more fatty alcohols, relative to the total weight of the composition,
one or more fatty acids,
one or more alkaline agents,
optionally one or more dyes chosen from oxidation dyes, direct dyes, and mixtures thereof, at least one composition comprising one or more chemical oxidizing agents as described above, preferably hydrogen peroxide.

According to another particular embodiment, the dyeing process comprises at least the application, to said fibres, of a composition obtained by mixing, at the moment of use:
at least one composition, as defined above, comprising:
one or more (C14-C30)alkyl (poly)glycosides,
from 8% to 35% by weight of one or more fatty alcohols, relative to the total weight of the composition,
one or more fatty acids,
one or more alkaline agents,
one or more dyes chosen from oxidation dyes, direct dyes and mixtures thereof,
at least one composition comprising one or more chemical oxidizing agents as described above, preferably hydrogen peroxide.

The oxidizing composition is preferably an aqueous composition. In particular, it comprises more than 5% by weight of water, preferably more than 10% by weight of water and even more advantageously more than 20% by weight of water.

The oxidizing composition also preferably comprises one or more acidifying agents. Among the acidifying agents, examples that may be mentioned include mineral or organic acids, for instance hydrochloric acid, orthophosphoric acid, sulfuric acid, carboxylic acids, for instance acetic acid, tartaric acid, citric acid or lactic acid, and sulfonic acids.

The oxidizing composition may also comprise fatty substances such as those described previously, preferably chosen from fatty alcohols, or liquid hydrocarbons comprising more than 16 carbon atoms and mixtures thereof, surfactants and polymers.

Usually, the pH of the oxidizing composition, when it is aqueous, is less than 7.

Preferably, the oxidizing composition comprises hydrogen peroxide as oxidizing agent, in aqueous solution, the concentration of which ranges, more particularly, from 0.1% to 30%, more particularly from 1% to 20% by weight, and even more preferentially from 2% to 15% by weight, relative to the weight of the oxidizing composition.

The composition according to the invention may be used on wet or dry keratin fibres, and also on any type of fair or dark, natural or dyed, permanent-waved, bleached or relaxed fibres.

According to a particular embodiment of the process of the invention, the fibres are washed before applying the composition described above.

The application of the composition of the invention to the keratin fibres may be carried out by any conventional means, in particular by means of a comb, a fine brush, a coarse brush, with the hand or with the fingers.

The dyeing process, i.e. application of the dyeing and/or lightening composition to the keratin fibres, is generally carried out at ambient temperature (between 15° C. and 25° C.).

The composition according to the invention may be applied to the keratin fibres for a leave-on time ranging from 30 to 60 minutes.

After application of the composition according to the invention, the keratin fibres may optionally be washed with a shampoo and/or be rinsed with water.

The present invention also relates to the use of the composition according to the invention as described previously for dyeing and/or lightening, preferably dyeing, keratin fibres, in particular human keratin fibres such as the hair.

The present invention also relates to a ready-to-use composition, comprising:
one or more (C14-C30)alkyl (poly)glycosides, as defined previously,
from 8% to 35% by weight of one or more fatty alcohols, relative to the total weight of the composition, as defined previously,
one or more fatty acids, as defined previously,
one or more alkaline agents, as defined previously,
optionally one or more dyes chosen from oxidation dyes, direct dyes, and mixtures thereof, as defined previously,
one or more oxidizing agents as defined previously, preferably hydrogen peroxide.

The invention further relates to a multicompartment device comprising at least a first compartment containing the composition according to the invention as described hereinabove, preferably comprising at least one dye chosen from oxidation dyes, direct dyes and mixtures thereof, and at least a second compartment containing one or more oxidizing agents as described hereinabove, preferably hydrogen peroxide.

The examples that follow serve to illustrate the invention without, however, being limiting in nature.

EXAMPLES

Example 1

Composition A (comparative) and composition B (according to the invention) were prepared from the following ingredients, expressed in % by weight:

TABLE 1

|  | Composition A | Composition B |
|---|---|---|
| Xanthan gum | 0.2 | 0.2 |
| Oleic acid | 2.7 | 2.7 |
| Ethanolamine | 12.3 | 12.3 |
| Coco glucoside | 1.87 | — |
| Cetearyl glucoside | — | 1.87 |
| Hydroxybenzomorpholine | 0.3 | 0.3 |
| 2-Methoxymethyl-p-phenylenediamine | 0.3 | 0.3 |
| 1,3-Propanediol | 5 | 5 |
| Tetrasodium glutamate diacetate | 0.2375 | 0.2375 |
| Glycerol | 5 | 5 |
| Cetearyl alcohol | 16.3 | 16.3 |
| Oleyl alcohol | 2.7 | 2.7 |
| Water | qs 100 | qs 100 |

Composition C was prepared from the following ingredients, expressed in % by weight:

TABLE 2

|  | Composition C |
|---|---|
| Trideceth-2 carboxamide MEA | 0.85 |
| Tetrasodium etidronate | 0.06 |
| Sodium salicylate | 0.035 |
| Glycerol | 0.50 |
| Cetearyl alcohol | 2.28 |
| Ceteareth-25 | 0.57 |
| Phosphoric acid | qs pH = 2.2 ± 0.2 |
| Hydrogen peroxide | 6 |
| Tetrasodium pyrophosphate | 0.04 |
| Water | qs 100 |

At the moment of use, each of the compositions A and B is mixed with one and a half times of oxidizing composition C.

Each of the mixtures is then applied to a lock of permanent-waved hair containing 90% white hairs, in a proportion of 5 g of mixture per gram of hair.

After a leave-on time of 30 minutes on a plate thermostatically regulated at 27° C., the hair is rinsed, washed with a shampoo, and dried.

The colouring of the hair is evaluated in the L*a*b* system, using a Konica Minolta CM-3600A spectrocolorimeter (illuminant D65, angle 10°, specular component included) in the CIELab system.

In this system, L* represents the lightness. The lower the value of L*, the darker and more powerful the colouring obtained. The chromaticity is measured by the values a* and b*, a* representing the red/green axis and b* the yellow/blue axis.

The results are given in the table below:

TABLE 3

|  | L* |
|---|---|
| Mixture A + C (comparative) | 45.5 |
| Mixture B + C (invention) | 42.3 |

The composition according to the invention comprising cetearyl glucoside results in a better dyeing power compared to the comparative composition comprising coco glucoside.

Example 2

Composition A' (comparative) and composition B' (according to the invention) were prepared from the following ingredients, expressed in % by weight of active material (AM):

TABLE 4

|  | Composition A' | Composition B' |
|---|---|---|
| Xanthan gum | 0.2 | 0.2 |
| Oleic acid | 2.7 | 2.7 |
| Ethanolamine | 12.3 | 12.3 |
| Cetearyl glucoside | 1.3 | 1.3 |
| Hydroxybenzomorpholine | 0.3 | 0.3 |
| 2-Methoxymethyl-p-phenylenediamine | 0.3 | 0.3 |
| 1,3-Propanediol | 5 | 5 |
| Tetrasodium glutamate diacetate | 0.11 | 0.11 |
| Glycerol | 5 | 5 |
| Cetearyl alcohol | 5.2 | 19.3 |
| Oleyl alcohol | 2.7 | 2.7 |
| Sodium metabisulfite | 0.7 | 0.7 |
| Water | qs 100 | qs 100 |

Composition C' was prepared from the following ingredients, expressed in % by weight of active material (AM):

TABLE 5

|  | Composition C' |
|---|---|
| Trideceth-2 carboxamide MEA | 0.85 |
| Tetrasodium etidronate | 0.06 |
| Sodium salicylate | 0.035 |
| Glycerol | 0.50 |
| Cetearyl alcohol | 2.28 |
| Ceteareth-25 | 0.57 |
| Phosphoric acid | qs pH = 2.2 ± 0.2 |
| Hydrogen peroxide | 6 |
| Tetrasodium pyrophosphate | 0.04 |
| Water | qs 100 |

At the moment of use, each of the compositions A' and B' is mixed with one and a half times of oxidizing composition C'.

Each of the mixtures is then applied to locks of 90% permanent-waved white hair, in a proportion of 10 g of mixture per gram of hair.

After a leave-on time of 30 minutes on a plate thermostatically regulated at 27° C., the hair is rinsed, washed with a standard shampoo, and dried.

The colouring of the hair is evaluated in the L*a*b* system, using a Konica Minolta CM-3600A spectrocolorimeter (illuminant D65, angle 10°, specular component included) in the CIELab system.

In this system, L* represents the power of the colouring obtained. The lower the value of L*, the darker and more powerful the colouring obtained. The chromaticity is measured by the values a* and b*, a* representing the red/green axis and b* the yellow/blue axis.

The results are given in the table below:

TABLE 6

|  | L* |
|---|---|
| Mixture A' + C' (comparative) | 44.69 |
| Mixture B' + C' (invention) | 42.27 |

The composition according to the invention (mixture B'+C'), i.e. comprising a total content of fatty alcohol ranging from 8 to 35% by weight, results in a lower L* value, therefore in a better dyeing power compared to the comparative composition (mixture A'+C').

The invention claimed is:

1. Cosmetic composition comprising:
    one or more (C14-C30)alkyl (poly)glycosides,
    from 8% to 35% by weight of one or more fatty alcohols, relative to the total weight of the composition,
    one or more fatty acids,
    one or more alkaline agents,
    optionally one or more dyes chosen from oxidation dyes, direct dyes and mixtures thereof.

2. Composition according to claim 1, characterized in that the (C14-C30)alkyl (poly)glycoside(s) is/are chosen from the compounds of formula (X) below:

$$R1O\text{-}(R2O)t(G)v \qquad (X)$$

in which formula (X):
    R1 represents a linear or branched, saturated or unsaturated alkyl group including from 14 to 30 carbon atoms, or an alkylphenyl group in which the linear or branched alkyl group includes from 14 to 30 carbon atoms,
    R2 represents an alkylene group including from 2 to 4 carbon atoms,
    G represents a saccharide unit including 5 or 6 carbon atoms,
    t denotes a value ranging from 0 to 10, and
    v denotes a value ranging from 1 to 15.

3. Composition according to claim 1, characterized in that the (C14-C30)alkyl (poly)glycoside(s) is/are chosen from (C14-C22)alkyl (poly)glucosides.

4. Composition according to claim 1, characterized in that the total content of the (C14-C30)alkyl (poly)glycoside(s) ranges from 0.01% to 20% by weight, preferably from 0.02% to 10% by weight relative to the total weight of the composition.

5. Composition according to claim 1, characterized in that the fatty alcohol(s) is/are chosen from fatty alcohols comprising 14 to 40 carbon atoms.

6. Composition according to claim 1, characterized in that the total content of the fatty alcohol(s) ranges from 8% to 30% by weight, relative to the total weight of the composition.

7. Composition according to claim 1, characterized in that the fatty acid(s) is/are chosen from myristic acid, palmitic acid, stearic acid, oleic acid, and mixtures thereof.

8. Composition according to claim 1, characterized in that the total content of the fatty acid(s) ranges from 0.1% to 15% by weight, relative to the total weight of the composition.

9. Composition according to claim 1, characterized in that the alkaline agent(s) are chosen from alkanolamines; aqueous ammonia, carbonates or bicarbonates, alkali metal or alkaline-earth metal silicates or metasilicates and mixtures thereof.

10. Composition according to claim 1, characterized in that the total content of the alkaline agent(s) ranges from 0.1% to 40% by weight, relative to the total weight of the composition.

11. Composition according claim 1, characterized in that it comprises one or more dyes chosen from oxidation dyes, directs dyes and mixtures thereof.

12. Composition according to claim 1, characterized in that it comprises one or more oxidation dyes chosen from oxidation bases.

13. Composition according to claim 1, characterized in that it comprises one or more oxidation dyes chosen from couplers.

14. Composition according to claim 1, characterized in that it further comprises one or more chemical oxidizing agents.

15. Process for dyeing and/or lightening keratin fibres, comprising the application to said fibres a composition according to claim 1.

16. Process for dyeing and/or lightening keratin fibres, comprising the application of a composition according to claim 1 and the application of composition comprising one or more chemical oxidizing agents.

17. Multicompartment device comprising at least a first compartment containing the composition as defined according to claim 1, and at least a second compartment containing one or more oxidizing agents.

18. Composition according to claim 1, characterized in that the fatty acid(s) is oleic acid.

19. Composition according to claim 1, characterized in that the alkaline agent(s) is/are chosen from alkanolamines.

20. Composition according to claim 1, characterized in that it comprises one or more oxidation dyes that are couplers chosen from 6-hydroxybenzomorpholine, 2,4-diamino-1-(β-hydroxyethyloxy)benzene, 2-amino-3-hydroxypyridine, 5-amino-6-chloro-2-methylphenol, 1-methyl-2-hydroxy-4-β-hydroxyethylaminobenzene, 2-amino-4-hydroxyethylaminoanisole, hydroxyethyl-3,4-methylenedioxyaniline, 2-amino-5-ethylphenol, 1-hydroxy-3-aminobenzene, their addition salts, their salts and/or the solvates of their salts and mixtures thereof.

21. Composition according to claim 1, characterized in that it further comprises one or more chemical oxidizing agents chosen from hydrogen peroxide, urea hydrogen peroxide, alkali metal bromates, persalts and mixtures thereof.

* * * * *